(12) United States Patent
Chiang

(10) Patent No.: US 6,220,796 B1
(45) Date of Patent: Apr. 24, 2001

(54) MULTIPURPOSE DRILLING JIG

(76) Inventor: Vance Chiang, P.O. Box 63-150, Taichung City (406) (TW)

( * ) Notice: Subject to any disclaimer, the term of this patent is extended or adjusted under 35 U.S.C. 154(b) by 0 days.

(21) Appl. No.: 09/388,842

(22) Filed: Sep. 1, 1999

(30) Foreign Application Priority Data

Jul. 11, 1999 (TW) .................................................. 88211809

(51) Int. Cl.$^7$ ................................................... B23B 49/00
(52) U.S. Cl. ........................................ 408/115 R; 408/97
(58) Field of Search ..................... 408/97, 103, 115 R, 408/241 G

(56) References Cited

U.S. PATENT DOCUMENTS

| | | | | |
|---|---|---|---|---|
| 2,466,023 | * | 4/1949 | Griffin | 408/115 R |
| 4,176,989 | * | 12/1979 | Wolff | 408/115 R |
| 4,474,514 | * | 10/1984 | Jensen | 408/115 R |
| 4,583,889 | * | 4/1986 | Fallon | 408/115 R |
| 4,594,032 | * | 6/1986 | Warburg | 408/115 R |
| 4,602,898 | * | 7/1986 | Brown et al. | 408/115 R |
| 5,407,306 | * | 4/1995 | Klapperich | 408/115 R |

FOREIGN PATENT DOCUMENTS

| | | | | |
|---|---|---|---|---|
| 136080 | * | 4/1985 | (EP) | 408/115 R |
| 2092488 | * | 8/1982 | (GB) | 408/115 R |

* cited by examiner

Primary Examiner—Daniel W. Howell

(57) ABSTRACT

A multipurpose drilling jig comprises a jig body and a perpendicular stop. The jig body has a plurality of locating holes and a recessed section which is provided for the fitting of a cover plate pressing against a guide sleeve. The jig body and the perpendicular stop are provided with insertion slot mounts for inserting thereinto a plurality of replaceable locating bodies. The locating bodies are provided with a straddling slot. The jig body is provided in two sides with a threaded hole mount which is in turn provided with a locating rib serving as a support for a side locating plate. The side locating plate has a through hole which is aligned with the threaded hole mount to enable the installation by a mounting screw such that the end surface and the lower lateral length of the side locating plate exceeds the height of the jig body to provide a perpendicular support surface serving as standard criterion of positioning, thereby enabling the locating and guidance operation for drilling a wide range of holes to accommodate various types of dowels.

3 Claims, 5 Drawing Sheets

MULTIPURPOSE DRILLING JIG

BACKGROUND OF THE INVENTION

1) Field of the Invention

The invention herein relates to a multipurpose drilling jig having applications as a woodworking tool that assists in drilling series of perpendicular holes.

2) Description of the Prior Art

When drilling holes in woodworking, the best quality is achieved by utilizing a specialized vise or clamps to assist the operation. This is especially true in the case of most do-it-yourself household furniture. One common example is the perpendicular conjoinment of the two wood planks A and B, as indicated in FIG. 2, FIG. 3, and FIG. 4, wherein a series of holes must be drilled for the perpendicular insertion of the dowels C to accomplish the conjoinment. When drilling holes in woodworking, the best quality is achieved by utilizing a specialized vise or clamps to assist the operation. This is especially true in the case of most do-it-yourself household furniture. One common example is the perpendicular conjoinment of the two wood planks A and B, as indicated in FIG. 2, FIG. 3, and FIG. 4. A series of holes must be drilled for the perpendicular insertion of the dowels C to accomplish the conjoinment. The holes in the two wood planks A and B must be drilled accurately such that they are equidistantly apart from one another. Any discrepancy will preclude serial conjoinment. A drilling jig is therefore used. As shown in FIG. 1, the drilling jig is composed of a jig body 1 and a perpendicular stop 2 at the bottom section of the jig body 1. Three locating holes 3 are bored in the top section 1a of the jig body 1 for the placement of a guide sleeve 4 and two locating pins 6a to guide the drilling of the holes. The provisions for attaching a handle 5 are provided at the rear end 1b, whereas the parallel straddling slots 6 and 7 are formed in the front end 1c and the perpendicular stop 2, so as to provide straddling over the woodworking dowels C. As shown in FIGS. 2–4, the perpendicular stop 2 is supported against the side of the wood planks and the guide sleeve 4 in the top section of the jig body 1, so as to drill the perpendicular holes. Thereafter, the dowels C are inserted into the holes already drilled and then into the front end 1c of the jig body 1 or the parallel straddling slots 6 and 7, which are straddled into position over the outer diameter of the perpendicular woodworking dowels C such that the perpendicular dowels C are in the plank A, and that the straddling slots 6 and 7 serve as a standard criterion for positioning the guide sleeve 4 in the top section of the jig body 1 to guide the drill bit in the boring of the perpendicular holes in other wood plank B, thereby completing the operation of drilling the holes needed to conjoin the two wood planks A and B. The conventional dowel hole drilling jig seems practical; nevertheless it is not confirmed in actuality. A variety of dowel diameters and physical dimensions are available. The width of the front end 1c of the jig body 1 and the width of the straddling slots 6 and 7 in the perpendicular stop 2 are fixed. If the straddling slot width of the drilling jig is not exactly the same as the diameter and the physical dimensions of the working dowels, the drilling jig will be unusable, thereby requiring additional purchase of another unit matching the specifications. In addition, the guide sleeve 4 in the top section of the jig body 1 inserted into the locating hole 3 is freely movable, it is readily dislodged and lost during utilization or carriage, especially at the time when the drill bit is raised and when the guide sleeve 4 falls out after being drawn up. This type of the jig can only be utilized as drilling jig on level surfaces and does not function fully for drilling a vertical woodworking object.

In view of the said shortcomings, the inventor of the invention herein, based on many years of experience in the production and marketing of this category of products, conducted extensive research and testing, which finally culminated in the development of the practical invention herein.

SUMMARY OF THE INVENTION

The primary objective of the invention herein is to provide a multipurpose drilling jig that is capable of excellent locating and guiding for a wide range of dowel specifications and prevents the dislodging and loss of the guide sleeve during hole drilling.

Therefore, the multipurpose drilling jig of the invention herein is comprised of a jig body and a perpendicular stop conjoined to the bottom section of the said jig body; the said jig body has a number of locating holes formed in the top section that provide for placement of a guide sleeve and a movable locating pin which guide the drilling of perpendicular holes, provisions for a handle at the rear end, and aligned straddling slots in the front end and the said perpendicular stop that are capable of straddling and providing for the locating of woodworking dowels, and the innovations include the following aspects.

The jig body has a number of locating holes in the top section and a horizontally extending recessed section, with the recessed section providing for fitting of a cover plate that presses against the guide sleeve. The jig body and the perpendicular stop are provided at the front and the rear ends with insertion slot mounts arranged in a parallel alignment. The insertion slot mounts are provided with replaceable locating bodies which are in turn provided in the center line with a straddling slot. The jig body is provided in two sides with a threaded hole mount which is in turn provided in one side with a locating rib vertically disposed to serve as a parallel support for a side locating plate having a through hole in alignment with the threaded hole mount, thereby enabling installation by means of a mounting screw such that the end surface and lower lateral length of the side locating plate exceeds the height of the jig body to provide a perpendicular support surface serving as standard criterion of positioning to enable the locating and guidance operation for drilling a wide range of holes to accommodate various types of dowels.

To enable the examination committee to further understand the objectives, innovations, and advantages of the invention herein, the brief description of the drawings below is followed by the detailed description of the preferred embodiments.

DETAILED DESCRIPTION OF THE PREFERRED EMBODIMENTS

Figure 5:
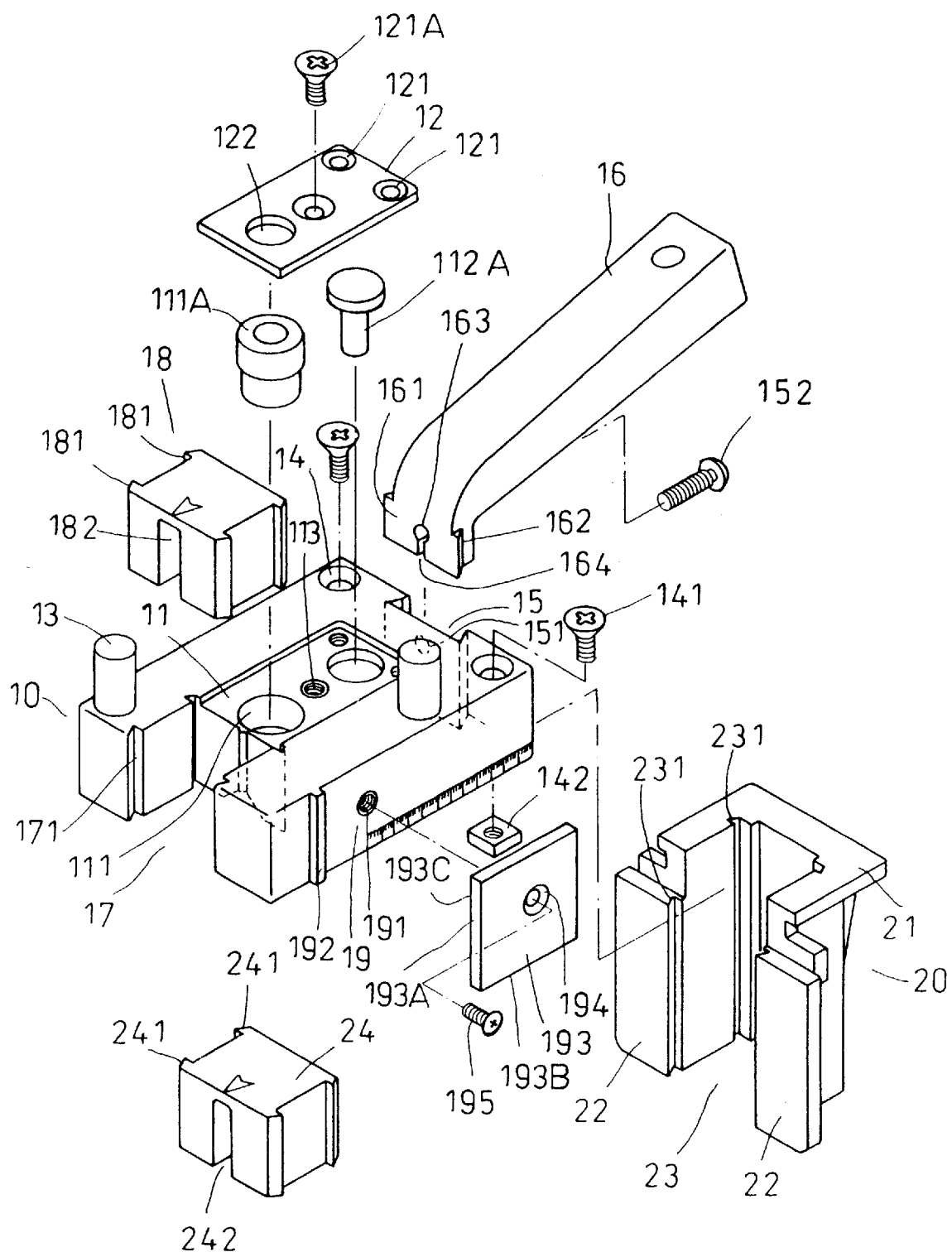
FIG. 5 is an exploded drawing of the most preferred embodiment of the invention herein.
Figure 6:
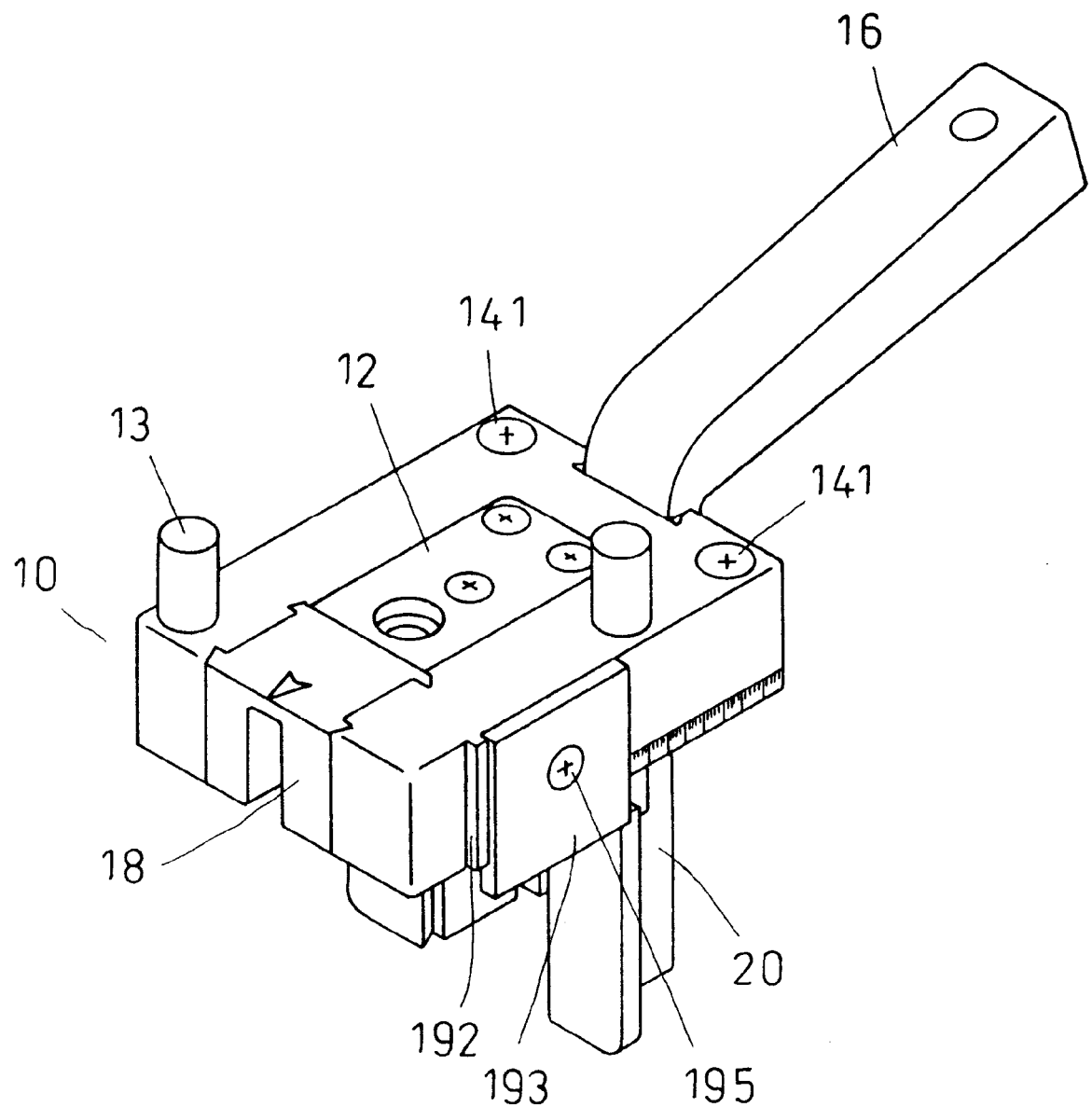
FIG. 6 is an isometric drawing of the most preferred embodiment of the invention herein.

Referring to FIG. 5 and FIG. 6, the multipurpose drilling jig of the invention herein is comprised of a jig body 10 and a perpendicular stop 20 conjoined to the bottom section of the said jig body 10.

A recessed section 11 is horizontally formed in the top section of the jig body 10. There are two locating holes 111 and 112 extending through the recessed section 11, with the locating holes 111 and 112 providing for the respective placement of a guide sleeve 111A and a movable locating pin 112A. The lower end of the locating hole 111 is flared to facilitate hole drilling guidance. Three threaded holes 113 are tapped at the front and the sides of the locating hole 112. A cover plate 12 is fitted flatly over the recessed section 11. The through holes 121 are formed in the cover plate 12 corresponding to the positions of the three threaded holes 113. A mounting screw 121A is inserted and tightened to secure the cover plate 12 downward to clamp the guide sleeve 111A against the top of the locating hole 111, thereby preventing the guide sleeve 111A from rising with the drill bit and becoming dislodged. The cover plate 12 is provided with a circular opening 122 having a diameter and hole center matching that of the guide sleeve 111A.

A locating column 13 is disposed diagonally at the front and rear comers of the said recessed section 11 to enable the sighting over the center point of the drilled object; two pivot holes 14 are vertically bored near the two comer at the rear end of the said jig body 10, with a mounting bolt 141 and fastening nut 142 installed in each said pivot hole 14; a dovetail mortise 15 is fashioned in the rear side of the said jig body 10 and, furthermore, a threaded hole 151 is tapped in the center of the said dovetail mortise 15 for the attachment of a handle 16 and, as indicated in FIG. 5, a flat support section 161 is formed on the front end of the said handle 16, a dovetail section 162 extends from both the left and right edges of the said support section 161, a mounting hole 163 is bored at the center line of the said support section 161 and, furthermore, a contiguous mounting slotway 164 is formed at the lower end of the said mounting hole 163 and, as such, the dovetail section 162 of the said handle 16 is mounted by insertion into the dovetail mortise 15 in the rear end of the said jig body 10, as shown in the drawings, and then secured by inserting and tightening a mounting screw 152 in the said threaded hole 151.

Figure 1:
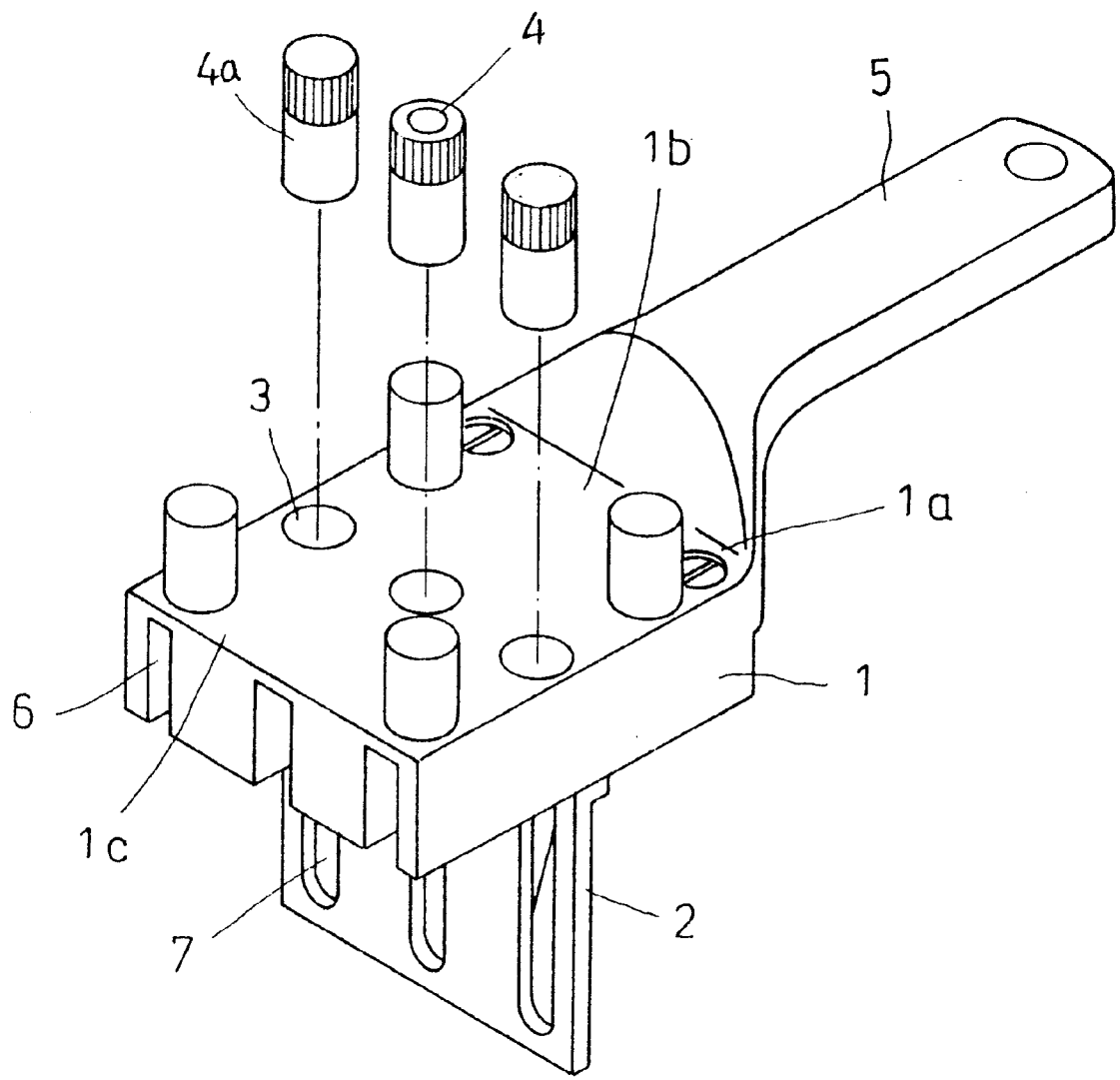
FIG. 1 is an isometric drawing of a conventional jig structure.
Figure 2:
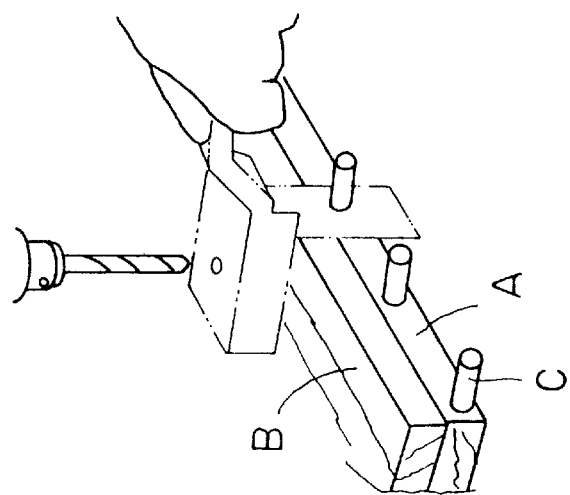
FIG. 2 is an isometric drawing of the operation for drilling a series of holes to conjoin two wood planks with dowels (1).
Figure 3:
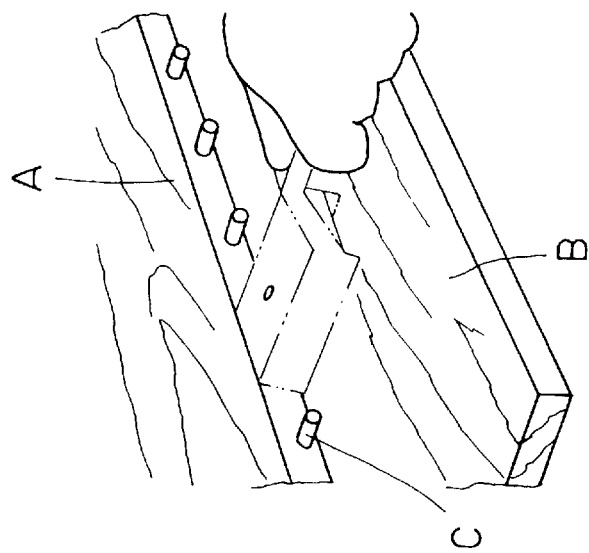
FIG. 3 is an isometric drawing of the operation for drilling a series of holes to conjoin two wood planks with dowels (2).
Figure 4:
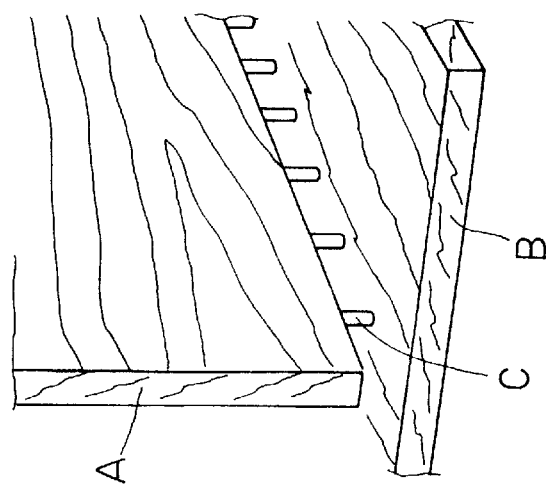
FIG. 4 is an isometric drawing of the operation for drilling a series of holes to conjoin two wood planks with dowels (3).

An insertion slot mount 17 is formed in the front end of the said jig body 10 and there are dovetail grooves 171 extending vertically in parallel within the said insertion slot mount 17, with the said dovetail grooves 171 providing for the insertion and positioning of a number of interchangeable locating bodies 18; dovetail sections 181 corresponding to the said dovetail grooves 171 are formed on both the left and right sides of the said locating bodies 18, wherein at the center line are straddling slots 182 that correspond to the dimensions of different width woodworking dowels C and that provide for straddling over the outer diameters and thereby serve as a standard criterion of positioning, as per the operation illustrated in FIG. 2, FIG. 3, and FIG. 4; tapped in each of the left and right sides of the said jig body 10 is a threaded hole mount 19 that provides for the installation and use of level guide shaft accessory (not shown in the drawings); the said threaded hole mount 19 consists of a centered threaded hole 191 that allows for the alternate installation of the handle 16, originally assembled to the rear end of the said jig body 10, to the threaded hole mount 19 on either the left or right side of the said jig body 10, thereby providing additional orientation options.

Figure 8:
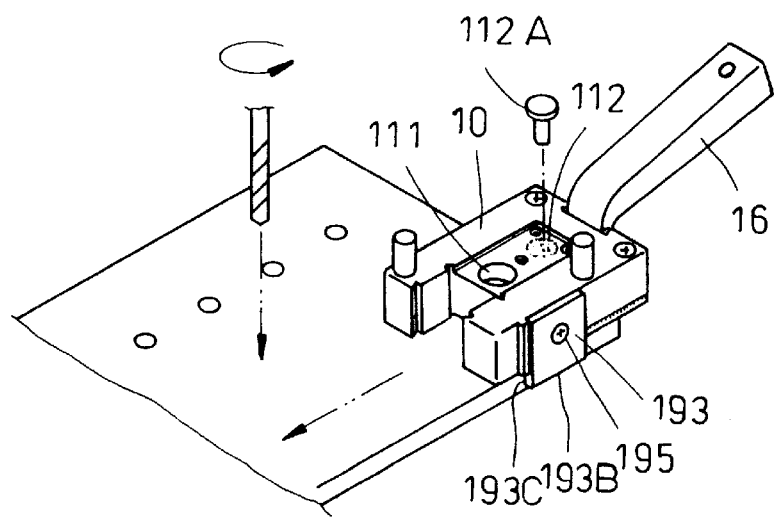
FIG. 8 is an isometric drawing of the hole position guide operation.

In addition, a locating rib 192 is vertically disposed at one side of the said threaded hole mounts 19 that serve as a parallel support for a side locating plate 193, and the said side locating plate 193 is installed by aligning the mounting through-hole 194 in its end surface with a threaded hole mount 19, then inserting and tightening a mounting screw 195 in the said threaded hole mount 19, wherein the vertical side 193A of the said side locating plate 193 is supported against the said locating rib 192, with the length of its horizontal planar side 193B extending downward beyond the height of the said jig body 10, as indicated in FIG. 8; as such, the inner planar surface 193C of the said side locating plate 193 is suspended below perpendicularly in a spatial structure that forms a support surface that serves as a standard criterion of positioning.

The said perpendicular stop 20 is an L-shaped body which, as indicated in FIG. 5 and FIG. 6, is comprised of a flat mounting plate section 21 that enables attachment against the bottom section of the said jig body 10, with the securing and mounting thereof accomplished by said two mounting bolts 141 and fastening nuts 142 installed in each of the said pivot holes 14 above at the two sides; a locating plate section 22 extends downward perpendicularly from the front end of the said mounting plate section 21, an insertion slot mount 23 is vertically formed along the center line of the said locating plate section 22, and dovetail grooves 231 are disposed vertically in the said insertion slot mount 23, with the said dovetail grooves 231 providing for the insertion and positioning of a number of interchangeable locating bodies 24; dovetail sections 241 corresponding to the said dovetail grooves 231 are formed on both the left and right sides of the said locating bodies 24, wherein at the center line are straddling slots 242 that correspond to the dimensions of different width woodworking dowels C and that provide for steadying on the outer diameters and serve as a standard criterion of positioning.

Figure 7:
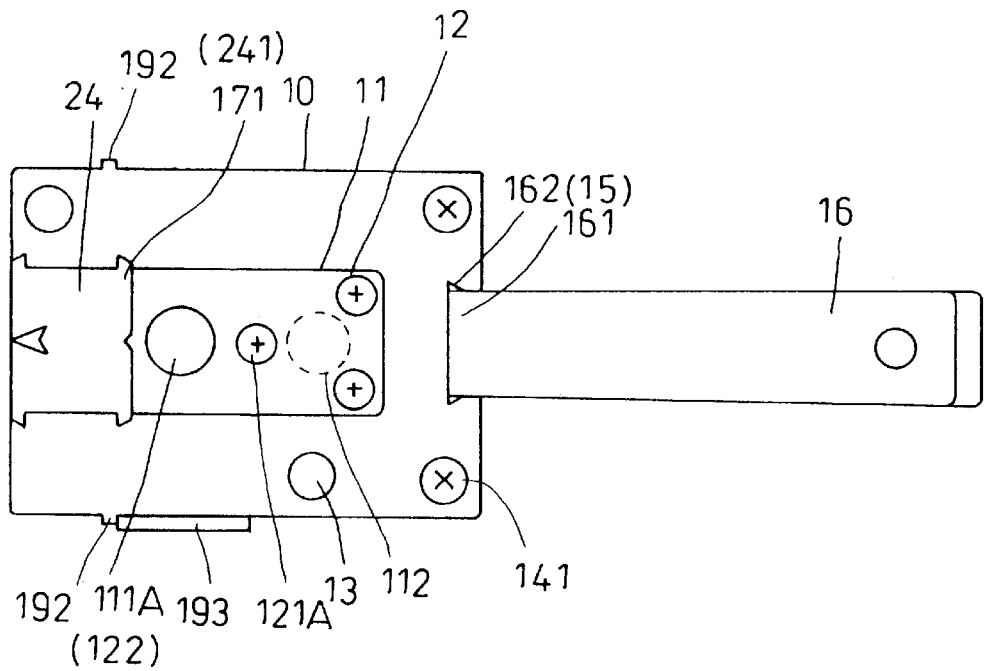
FIG. 7 is an orthographic drawing of the invention herein.

The assemblage constitutes the multipurpose drilling jig of the invention, as shown in FIGS. 6 and 7. The perpendicular stop 20 is conjoined to the bottom section of the jig body 10 to accomplish the operation illustrated in FIGS. 2–4. The guide sleeve 111A in the top section of the jig body 10 guides the drill bit in coordination with the locating pin 112A inserted into the locating hole 112 at its side setting a fixed interval between the perpendicularly drilled holesand, utilizing the insertion slot mount 17 formed in the front end of the jig body 10 or utilizing the insertion slot mount 23 formed vertically in the locating plate section 22 of the perpendicular stop 20 as a standard criterion of positioning the straddling slots 182 and 242 in the insertion slot mounts 17 and 23 on the locating bodies 18 and 24. The guide sleeve 111A in the top section of the jig body 10 guides the drill bit to bore perpendicular holes in another wood plank B which is stacked over. The locating pin 112 movably situated in the other locating hole 112 moves along the drilled holes in the wood plank to bore a series of holes all at a set standard interval apart to complete the drilling operation of the aligned dowel conjoinment holes in the two wood planks A and B.

It is also worth mentioning that due to the design of the insertion slot mount at the front end of the jig body 10 and the insertion slot mount 23 of the perpendicular stop 20 of the invention that serves as a standard criterion of positioning as well as the straddling slots 182 and 242 in the insertion slot mounts 17 and 23 on the locating bodies 18 and 24, respectively, that are straddled over the outer diameter of the perpendicular dowels C in the wood plank A, serving as a standard criterion of positioning. The locating bodies 18 and 24 of the insertion slot mounts 17 and 23 are interchangeable structures that enable the dowel hole drilling jig to guide drilling for dowels of any size specifications such that when different dimensions are required for an operation, it is only necessary to replace the locating bodies 18 and 24 to enjoy immediate usage and no purchase of additional jigs is required. The design of the present invention features a cover plate 12 that is fitted flatly over the recessed section 11 in the top section of the jig body 10, as shown in FIG. 7. The removable cover plate 12 pushes downward against the top end of the guide sleeve 111A at an appropriate degree of pressure to prevent the bit from rising from the hole being drilled and causing displacement, thereby ensuring smoother operation and preventing the loss of the guide sleeve 111A. The locating bodies 18 and 24 of the jig body 10 are installable by insertion and capable of remaining assembled when subjected to stress due to the block-shaped containment space of the insertion slot mounts 17 and 23 as well as the dovetail section 181 and 241 and the dovetail grooves 171 and 231 extending vertically at both sides of the front and rear.

Furthermore, due the structural design of the side locating plate 193 situated laterally on the jig body 10 of the invention herein, the vertical side 193A of the said side locating plate 193 is supported against the said locating rib 192 and, furthermore, secured in position by means of a screw fastener, thereby supporting the inner planar surface 193C of its horizontal planar side 193B which is suspended downward perpendicularly to form a support surface that serves as a standard criterion for positioning, with the standard criterion surface supported against the edge of the wood plank, as indicated in FIG. 8; after which, the guide sleeve 111A in the top section of the said jig body 10 guides the drill bit in coordination with the said locating pin 112A inserted into the locating hole 112 at its side setting a fixed interval between the perpendicularly drilled holes and when the drilling of the holes in the wood plank is completed, the locating pin 112A is inserted into the first hole, moved parallel-wise, and the second hole is drilled, with the procedure continued to the complete the operation of drilling a series of holes located at equal intervals apart; next, the said locating plate 193 is removed by loosening its mounting screw and the reinstalled to the locating rib 192 and threaded hole mount 19 on the other side of the said jig body 10, which is then repositioned on the dowels to conduct the same hole drilling operation from another direction; as such, a left and right row of holes all at matched equal intervals apart can be drilled rapidly and conveniently for the insertion of the metal dowels.

In summation of the foregoing section, since the technological concept of the structure as well as the innovative spatial configuration of the multipurpose drilling jig of the invention herein is capable of overcoming conventional impasses and, furthermore, capable of utilization as a hole drilling jig for a wider range of different sized dowels, while also effectively preventing the dislodging and loss of the guide sleeve, the present invention possesses more functional practicality than the conventional products.

What is claimed is:

1. A multipurpose drilling jig comprising a jig body and a perpendicular stop conjoined to a bottom section of said jig body, said jig body having a plurality of locating holes in a top section thereof for placing a guide sleeve and a movable locating pin for guiding the drilling of perpendicular holes, provisions for a handle at a rear end and aligned straddling slots in a front end and said perpendicular stop that are capable of straddling and providing for the locating of woodworking dowels, said jig body further having a horizontally extending recessed section in said top section, with said recessed section providing for fitting of a cover plate that presses against said guide sleeve, said jig body and said perpendicular stop being provided at a front end and a rear end with insertion slot mounts in a parallel alignment, said insertion slot mounts providing for the respective insertion of replaceable locating bodies, said locating bodies being provided along center lines with a straddling slot of a width, said jig body being tapped in each of two sides thereof with a threaded hole mount, with a locating rib being vertically disposed at one side of said threaded hole mounts, a side locating plate having a through hole aligned with said threaded hole mount, thereby enabling installation by means of a mounting screw such that the end surface and lower lateral length of said side locating plate exceeds the height of said jig body to provide a perpendicular support surface.

2. The multipurpose drilling jig as defined in claim 1, wherein said insertion slot mounts have an opening in a front side that serves as a containment space, said containment space being provided at an inner side and at a bottom end with a plurality of dovetail grooves parallel to one another and extending vertically; wherein said locating bodies are corresponding to a block shape of said containment space and are provided with a plurality of dovetail sections extending vertically in parallel at rear ends thereof to enable said dovetail sections to be inserted into said dovetail grooves of said insertion slot mounts.

3. The multipurpose drilling jig as defined in claim 1, wherein a dovetail mortise is vertically disposed along the rear end of the jig body, the dovetail mortise having a threaded hole, wherein said handle is separable from said jig body and is provided on a front end with a support section, said support section provided with a mounting hole and in a lower end with a mounting slotway, thereby enabling said handle support section to be secured to said body by inserting and tightening a mounting screw through the mounting hole and into the threaded hole, so as to achieve variable mounting to said jig body.

* * * * *